United States Patent [19]

Morriss, Jr.

[11] 4,334,140
[45] Jun. 8, 1982

[54] PIPE CLAMP WITH IMPROVED BAND CONNECTION

[75] Inventor: James C. Morriss, Jr., Nash, Tex.

[73] Assignee: JCM Industries, Inc., Nash, Tex.

[21] Appl. No.: 33,910

[22] Filed: Apr. 27, 1979

Related U.S. Application Data

[63] Continuation of Ser. No. 786,456, Apr. 11, 1977, abandoned.

[51] Int. Cl.³ .................. B23K 9/225; B65D 63/02
[52] U.S. Cl. ...................................... 219/127; 24/279
[58] Field of Search .......................... 219/127; 24/279

[56] References Cited

U.S. PATENT DOCUMENTS

| | | | |
|---|---|---|---|
| 2,787,039 | 4/1957 | Krasberg | 24/279 |
| 2,896,918 | 7/1959 | Schumacher | 24/279 |
| 3,204,665 | 9/1965 | Faint | 24/279 X |
| 3,510,624 | 5/1970 | Bennett | 219/127 X |
| 3,737,959 | 6/1973 | Smith et al. | 24/279 |

FOREIGN PATENT DOCUMENTS

| | | | |
|---|---|---|---|
| 291304 | 5/1928 | United Kingdom | 219/127 |
| 865483 | 4/1961 | United Kingdom | 219/127 |

OTHER PUBLICATIONS

*Welding Handbook*, Section Two "Welding Processes: Gas, Arc and Resistance", Sixth Edition, pp. 23.55-23.57, American Welding Society, New York, N. Y. 1969, TS 227, A5h c.3.

Carey, *Modern Welding Technology*, pp. 501, 509, 510, Prentice Hall, Inc.; Englewood Cliffs, N. J., 1979, TK 4660 C37.

*Primary Examiner*—J. V. Truhe
*Assistant Examiner*—Keith E. George
*Attorney, Agent, or Firm*—Owen, Wickersham & Erickson

[57] ABSTRACT

A high-strength low-bolt pipe clamp of the type having rigid lugs fixed to the ends of a flexible band results from an improved method for connecting the lugs to the band. The lugs are of cast material, while the band is of stainless steel. The connection between each lug and the band end is via a pair of initially open jaws on the lug that define a slot in which the band end is inserted. A plurality of spaced holes through the upper jaw of the lug are in registry with holes through the band end when it is inserted in the slot. The jaws are clamped together and deformed toward the band, and a weld is made in each hole to bind the two jaws together permanently and to securely affix the band to the jaws at the weld points. Preferably the weld fills each hole approximately flush with the surface of the lug.

4 Claims, 3 Drawing Figures

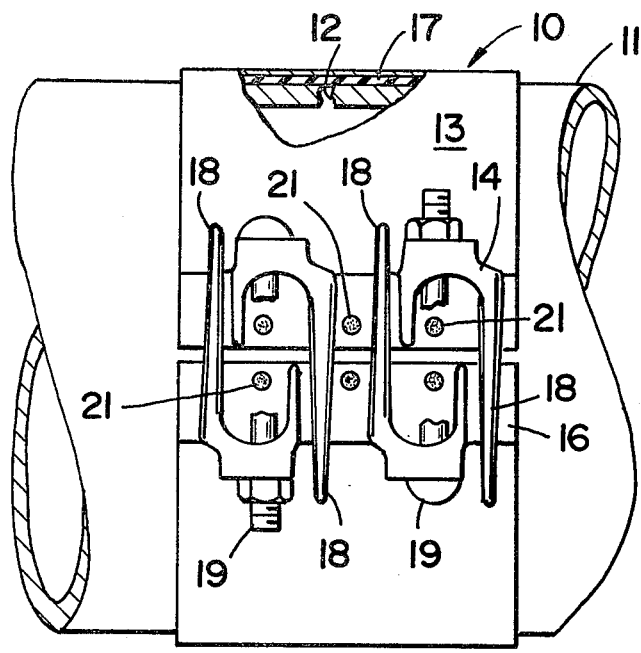
FIG_1
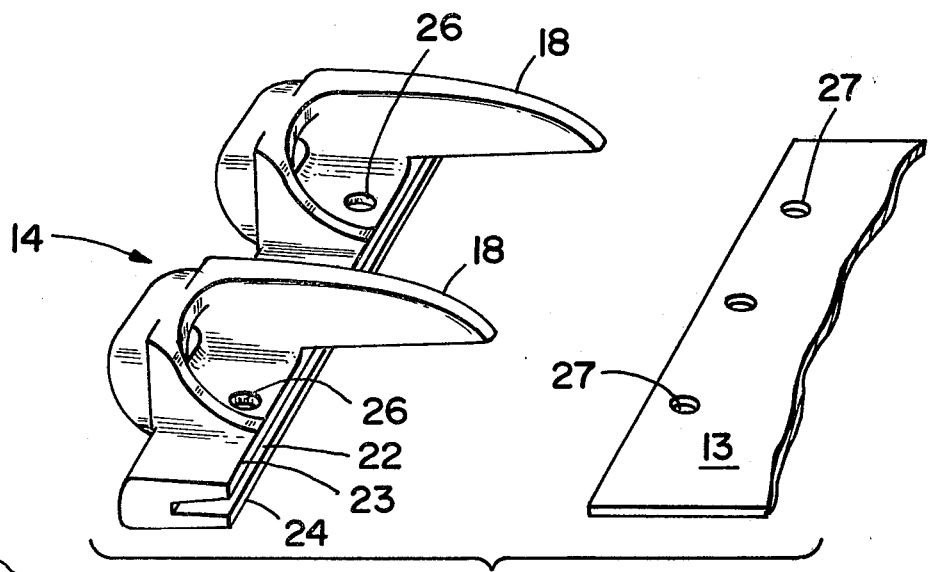
FIG_2
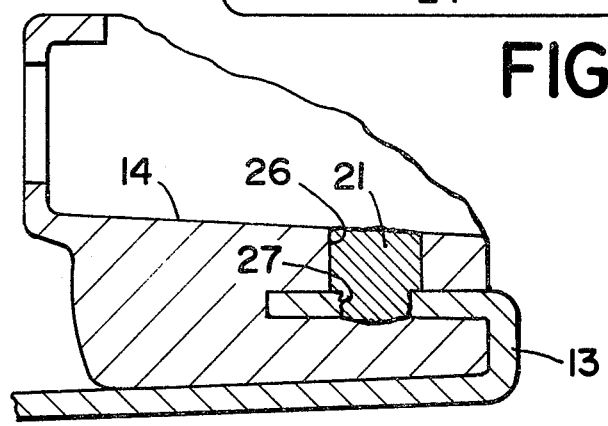
FIG_3

PIPE CLAMP WITH IMPROVED BAND CONNECTION

This is a continuation of application Ser. No. 786,456, filed Apr. 11, 1977, now abandoned.

BACKGROUND OF THE INVENTION

The invention relates to pipe repair clamps of the type in which rigid lugs are used to bring together the ends of a malleable band that extends around the pipe. More particularly, the invention relates to an improved connection for securing the ends of the band to the lug, and to a method for making the improved connection.

Pipe clamps utilizing a malleable band attached to rigid lugs are now widely used because of their versatility and effectiveness in meeting various conditions. In more recently developed clamps, the problem of bolt bending due to the tendency of the lugs to tip as the bolts are tightened has been largely overcome through the use of low bolt clamps with projecting fingers, and in these improved clamps greater amounts of torque can be applied to draw the lugs together. However, the ability of the lugs to withstand a greater band tightening force has increased the problem of securing the ends of the malleable band to the lugs. Accordingly, a general object of the present invention is to provide an improved pipe clamp structure for connecting the malleable bands to a pair of rigid lugs so that the band cannot possibly slip from the lugs or break loose from them, even when an unusually large tightening force is applied to draw the lugs together.

Efforts have long been made to provide a connecting structure for attaching the lugs to the flexible band that not only had adequate strength but also was practical and inexpensive to manufacture. In U.S. Pat. Nos. 3,089,212, 3,209,427 and 3,584,353 a slotted lug edge was utilized, with the band end crimped between the upper and lower jaws of the slot and deformed by projections on one jaw and corresponding recesses on the other jaw, as a gripping means.

U.S. Pat. No. 3,195,206 disclosed a lug-to-band connection wherein sharp tooth-like elements on the initially open jaws would bite into and grip the malleable band end when the jaws were clamped together onto the band. U.S. Pat. No. 3,254,387 disclosed another gripping means wherein one of the open lug jaws had projections which, upon closure of the jaws, would pass through an opening in the band end to grip the band. Other band gripping means have been disclosed in U.S. Pat. Nos. 3,183,938 and 3,267,547. In some connections the two jaws of the lug have been pinned together through the band in an attempt to prevent later separation of the jaws, but this has proven ineffective.

A pipe clamp made entirely from rolled or extruded metal and welded together is disclosed in U.S. Pat. No. 3,737,959. The lugs of that pipe clamp also gripped the band via a slot in the lug in which the band end was positioned. The three relatively thin layers of metal—the two lug jaws and the band—were then spot-welded at intervals along the lug, binding all three layers together at the weld points. This has been a standard practice in sheet metal work, for securing a sheet metal "sandwich". Although the present invention described below involves welding among a pair of jaws and a band, it is a very different type of weld and welding operation and is particularly advantageous for reasons which will be discussed below.

SUMMARY OF THE INVENTION

The present invention provides an improved band gripping means for a pipe clamp and a method for producing the improved connection. A pair of cast lugs include slots defined by upper and lower jaws cast in a somewhat open position for receipt of the end of a stainless steel band. One jaw of the lug includes several spaced holes extending through toward the other jaw. Preferably the outer jaw includes the holes. The stainless steel band also includes spaced holes, preferably slightly smaller than those of the lug jaw, positioned to be in registry with the jaw holes when the band is positioned in the slot. With the holes in registry, the slot is closed on the band by an external clamping pressure applied evenly on the lug jaws. After the clamping pressure has been applied, a weld is performed through each set of aligned holes so that the two jaws about the slot are securely welded and retained together, with the band welded to the jaws where the weld passes through the hole in the band. Preferably the holes are filled with weld to be approximately flush with the surface of the lug.

The welding is preferably performed using a mig gas-shielded arc with a timed cycle. However, it may be accomplished using stick electrodes, submerged arc or flux core welding wire.

The band connection method of the invention prevents the lug slot from opening under the high stresses associated with tightening the pipe clamp over a pipe, and also fastens the band securely to the lug at the weld points with a minimum of welding.

The connection also allows the lug to be reduced in weight while still providing optimum strength and rigidity.

Accordingly, it is among the objects of the invention to provide a connection method and means for tightly securing a non-cast material band to both sides of the slot of a cast lug in a pipe clamp with a minimum of welding and with minimum total weight of the assembled pipe clamp, resulting in a pipe clamp of superior strength. This and other objects, advantages and features of the invention will be apparent from the following description of a preferred embodiment, taken in conjunction with the accompanying drawings.

DESCRIPTION OF THE DRAWINGS

FIG. 1 is a partially broken away plan or elevation view showing a portion of a pipe having a pipe clamp according to the invention assembled thereon;

FIG. 2 is an exploded view in perspective illustrating the manner in which the pipe clamp lug and band are connected; and FIG. 3 is a sectional view through a weld in an assembled pipe clamp.

DESCRIPTION OF THE PREFERRED EMBODIMENT

In the drawings, FIG. 1 shows a pipe clamp 10 as it appears when normally installed on a pipe 11 for stopping a leak 12 through the wall of the pipe or for coupling the ends of two adjoining pipe sections. As in typical such clamps, the clamp 10 comprises a malleable band 13 whose ends are preferably bent over and installed in two lugs 14 and 16, as shown, for example, in U.S. Pat. Nos. 3,089,212, 3,209,427 and 3,584,353. The installation is also illustrated in the sectional view of FIG. 3, discussed below. As shown in FIG. 1, the pipe 11 is typically surrounded beneath the band 13 with a flexible gasket 17 of some yieldable, rubber-like material which completely covers the break 12 in the pipe wall or the pipe joint.

The lugs 14 and 16, one of which is shown in perspective in FIG. 2, preferably include finger-like projections 18 which help stabilize the lugs and prevent them from tipping when the bolts 19 are tightened, as shown in U.S. Pat. Nos. 3,209,427, 3,584,353 and 3,737,959.

In FIG. 1, the tightener bolts 19 are shown partially broken away to reveal the central feature of the invention. Welds 21, spaced along each lug 14 and 16 at preferably about one and one-half inch spacing, provide for a high strength, permanent connection between the lugs 14 and 16 and the band 13. The structure of this connection is best understood with reference to FIGS. 2 and 3.

FIG. 2 is an exploded view illustrating the manner of initial connection of a lug 14 to an end of the band 13. For economy, strength and the needed malleability of the band 13, the lugs are preferably of a cast steel material, while the band 13 is preferably of stainless steel. As shown in FIGS. 2 and 3, the lug 14 preferably is integrally formed and is cast with a slot 22 formed from upper and lower jaws 23 and 24 which taper outwardly slightly away from each other so that the slot can easily receive the end of the band 13. This method of connection as described thus far is typical of many of the pipe clamps disclosed in the above-cited patents. However, the lug-to-band connection of the present invention utilizes sets of holes 26 in the upper lug jaw 23 and 27 in the band 13. In a two-finger lug 14 as shown, three holes 26 are ordinarily provided, preferably on one and one-half inch spacing. The band holes 27 are at the same spacing, since they are to be in registry with the lug holes 26 when the components are assembled. The lug holes 26 may be bored through the upper jaw 23 after the lug is cast, but it is preferable that these holes be cored through the jaw during casting. The preferred diameter of these holes 26 is about 5/16". The band holes 27, which may be punched or drilled, are slightly smaller, preferably about ¼" in diameter.

The end of the band 13 is inserted into the jaw slot 22 so that the holes in the band are aligned with the holes in the upper lug jaw. An external clamping force is then applied evenly to the lug 14, pushing the two jaws toward one another and establishing a closer fit between the slot and the band. Then, using a stainless steel welding wire or rod, welding is performed through the holes in the lug and the band so that the two lug jaws are securely welded together and the band is also welded to both jaws of the lug where the weld passes through the band holes. The holes are preferably filled until the weld is approximately flush with the surface of the lug. The three layers are thus securely welded together at the hole locations, securing the band to the lug, and the slot is prevented from later separation.

FIG. 3 shows the lug 14, the band 13 and the weld 21 in section following the welding operation and the bending back of the band beneath the lug in the usual manner.

The weld 21 is preferably produced using a mig gas shield arc with a timed cycle. Alternatively, however, the welding may be accomplished by using stick electrodes, submerged arc or flux core welding wire.

Although the described method is preferred, the connection need not include clamping of the jaws together to reduce the slot size on the band. The lug may be cast with a slot which fits more closely over the band end, so that with the jaws retained together by welding there is little clearance around the band and it is effectively secured against pulling out.

By the described method of lug-to-band connection, the lug may be significantly reduced in weight while still providing maximum strength, rigidity and resistance to the pulling outward of the band and opening of the slot during tightening. The connection is far superior to earlier connections involving pinning of the two lug jaws together. Heavy tonnage presses, expensive assembly and complicated tooling characteristic of many previous connection methods are eliminated with the connection formed according to the invention.

The above described preferred embodiment provides a pipe clamp having a highly efficient and dependable connection means between the lugs and the band, with significant reduction in the cost of producing the clamp. Various other embodiments and alterations to this preferred embodiment will be apparent to those skilled in the art and may be made without departing from the spirit and scope of the following claims.

I claim:

1. In the production of a low-bolt pipe clamp of the type having a malleable band secured to cast metal lugs, which in service are drawn together by bolts to seal together two sections of pipe, a method for securing the malleable band to each cast metal lug to produce a high-strength, shear resistant connection, comprising the steps of:

providing an integrally formed cast lug with open jaws across its width, spaced apart sufficiently to receive the end of the band between them, with holes through at least one jaw, spaced across its width;

inserting the band into the cast lug between the open jaws, with spaced holes in the band end aligned in registry with the jaw holes; and welding the jaws and the band together through the aligned holes and filling the holes with weld, generally flush with the outer surface of the jaw, thereby permanently maintaining the jaw spacing and providing locations where the two jaws and the band are securely welded together.

2. The method of claim 1 which further includes clamping the jaws toward one another following insertion of the band to reduce the clearance between the jaws and the band.

3. The method of claim 1 wherein the welding step is accomplished by a mig gas shielded arc.

4. A low-bolt pipe clamp of the type having a non-cast malleable band secured to a pair of cast metal lugs, said pipe clamp being formed according to the method of claim 1.

* * * * *